United States Patent
Bittner et al.

(10) Patent No.: US 7,290,147 B2
(45) Date of Patent: Oct. 30, 2007

(54) METHOD COMPUTER PROGRAM PRODUCT AND COMPUTER SYSTEM FOR MODIFYING ROLES THAT TRIGGER APPLICATION SERVICES

(75) Inventors: Peter Bittner, Hockenheim (DE); Bernhard Drittler, Walldorf (DE); Jürgen Heymann, Leimen (DE); Sterfan Kusterer, Nussloch (DE); Sven Schwerin-Wenzel, Dielheim (DE); Thorsten Vieth, Wiesloch (DE)

(73) Assignee: SAP AG, Walldorf, DE (US)

( * ) Notice: Subject to any disclaimer, the term of this patent is extended or adjusted under 35 U.S.C. 154(b) by 689 days.

(21) Appl. No.: 10/472,243

(22) PCT Filed: Mar. 15, 2002

(86) PCT No.: PCT/EP02/02886

§ 371 (c)(1),
(2), (4) Date: Apr. 29, 2004

(87) PCT Pub. No.: WO02/075537

PCT Pub. Date: Sep. 26, 2002

(65) Prior Publication Data

US 2004/0205039 A1 Oct. 14, 2004

(30) Foreign Application Priority Data

Mar. 20, 2001 (EP) ................................. 01106903

(51) Int. Cl.
*G06F 9/00* (2006.01)
(52) U.S. Cl. ........................ 713/187; 713/191; 713/193
(58) Field of Classification Search ................ 713/187, 713/191, 193
See application file for complete search history.

(56) References Cited

OTHER PUBLICATIONS

Dinah McNutt, et al., "Role-based System Administrator or Who, What, Where, and How," LISA, Nov. 1-5, 1993, pp. 107-112.
Jonathan D. Moffett, et al., "The Uses of Role Hierarchies in Access Control," ACM, 1999, pp. 153-160.
Sang Yeob Na, et al., "Role Delegation in Role-Based Access Control," ACM, 2000, p. 39-44.

*Primary Examiner*—Thomas R. Peeso
(74) *Attorney, Agent, or Firm*—Mintz, Levin, Cohn, Ferris, Glovsky and Popeo, P.C.

(57) ABSTRACT

The present invention discloses a method, computer program product and system for adjusting roles in a computer system (100) that launch application services (301-307) by a first user who is assigned to at least one role. A first role (110) calls a second role (150) by reference (111). Both roles comprise representations of applications services (101, 102, 103) and (104, 105). When representations in the second role are modified, for example, application services are added (106, 107), a delta list (112) for the first reference is automatically created to conditionally prevent the first role (110) from referencing to at least some of the modified representations of the second role (150). This is achieved by using a rule database (118) containing rules about application services that are mutually exclusive and checking for conflicts between the representations of the first role and modified, second role. A second user, e.g. a system administrator, can accept or reject automatically created delta entries (114) in the delta list (112).

22 Claims, 8 Drawing Sheets

METHOD COMPUTER PROGRAM PRODUCT AND COMPUTER SYSTEM FOR MODIFYING ROLES THAT TRIGGER APPLICATION SERVICES

BACKGROUND OF THE INVENTION

1. Field of the Invention

The present invention generally relates to a role-based computer system that triggers computer application services, and more particularly, relates to a method, computer program product and system for adjusting the roles in a continuously changing business environment.

2. Description of the Prior Art

FIG. 1 illustrates a simplified diagram of computers 1 to N that are interconnected by local area networks (LAN) or wide area networks (WAN), or other computer networks known in the art. A computer user identifies himself or herself to a so-called role system (e.g., on computer 3) via a human interface, such as a display screen with a keyboard as input device or the like (e.g., on computers 1-2) and uses some or all of applications services ("AS", e.g., on computers 4-6).

Such computer based systems are used and of vital importance in almost all organizations such as, for example, manufacturing facilities, travel agencies, call centers, financial institutions, business organizations, etc.

In each organization, groups of users with similar responsibilities share application services that are part of business applications and used in business processes, whereas other groups of users with other predefined responsibilities require other application services of other business applications that are used in the same or other business processes. Business applications providing the application services (AS) are hosted, for example, on dedicated computers 4 to 6. The role system hosted on computer 3, provides predefined representations of these application services to the user (not shown in FIG. 1). The predefined representations are assigned to roles (e.g., 10, 11, 12). The application services belonging to a specific role are displayed to the user by a human interface (e.g., on the display devices of front end computers 1, 2, . . ., N), for example, by graphical symbols like icons. The application services AS that are assigned to different roles are complementary in a way that these roles all together cover all application services that need to be performed in a specific business process.

In other words, roles link users and business processes. For example, a purchasing agent gets access to all application services that he or she needs within the order fulfillment process, such as, checking supplier prices for a certain product over the internet and executing a purchasing transaction for that specific product. In parallel the purchasing agent might be involved in a new product development process, where new suppliers have to be identified for new parts and prices have to be negotiated for these new parts. All required applications services to support these business processes can be conveniently accessed by the user, who gets assigned to the role of a purchasing agent.

It is an advantage that within a role the total number of application services that are available in the connected application systems are not displayed. Rather roles only display application services that are required by a specific user. Thereby, roles help hiding the complexity of the overall system landscape from the user. This improves the usability of the human interface for the user.

However, application services constantly change; it is in the discretion of the organization to remove, add or otherwise modify the application services, for example, when business processes within the organization change, or when application services are updated (e.g., by a new release of an application system). This becomes especially important for managing organizational knowledge, as this knowledge gains more and more relevance in the execution of business processes. That is, document services that provide this knowledge are sometimes changed daily in periods of organizational change.

Further, the users of these application services change too: people join or leave the organization, get promoted or shift responsibilities within the organization. When people are replaced, the roles remain the same, but when people enhance their skill set through training, then their roles need to be adjusted.

Still further, the selection of services that are available to a single user at all must comply with predefined rules and criteria. For example, a user must be prevented from accessing conflicting services, specific users must have access to mutually dependent services.

Therefore, the role system (also "role repository") constantly requires an adjustment of its role definitions. This makes the management of role system difficult and requires a lot of manual role administration work. For example, a role administrator has to modify each role manually. Often a small change in a business process has impact on many different roles. The administrator, further, has to control the role consistency across all roles, whenever role upgrades are implemented or when roles change for other reasons, as explained before. This can affect hundreds of roles where the administrator needs to compare the changes with the predefined rules and criteria for avoiding conflicting services within a role.

SUMMARY OF THE INVENTION

The present invention provides method, computer program product and system for an improved role management. The invention solves the technical problem of automating role modifications that are imposed on an organization by the reasons described in the previous section. The automation of role modification is achieved by introducing a "delta list concept" in combination with a "call by reference concept" for roles that reference to other roles. In large organizations the number of roles can be higher than 1000. There is the technical problem of keeping all of these roles consistent according to legal requirements and the organization's policy.

The "delta list concept" in combination with the "call by reference concept" and the usage of a "rule data base" as defined in claims 1-18 also solves the technical problem of keeping a large number of roles consistent within an organization. The "call by reference feature" allows instant availability of all modifications of a child role for all parent roles that reference the child role and the "rule data base" ensures that all entries that are created in the delta list for the corresponding references between roles abide with the legal requirements and the company policy without needing human input.

Further, the access of a role to application services is critical for an organization from a security point of view. Therefore, specific users need to access additional application services that are not accessible through their roles or the users have to be prevented from access to application services that can be accessed through their roles. In both cases a technical problem arises to overrule automatically created delta lists that were created on the basis of the rule data base because for specific roles that are assigned to these specific users the rule data base might not apply and an exception is required. The features of claim 7 define a solution to this problem through providing the possibility for an administrator to reject or accept all of the modifications of a role.

The solution provided by the present invention is directed to:
a) a method as defined in claims 1-13 for modifying roles that launch application services;
b) a computer program product as defined in claims 14-16 for providing representations of application services to a user depending on the user's roles;
c) a computer system as defined in claims 17 and 18 for launching application services through roles and for modifying the roles; and
d) a computer-readable medium as defined in claims 19-22 having a plurality of sequences of instructions stored thereon, for performing the steps of the method under a) when executed by one or more processors.

These and other features of the present invention will be clear from a description of preferred embodiments with reference to the accompanying figures.

DETAILED DESCRIPTION OF A PREFERRED EMBODIMENT

Figure 1:
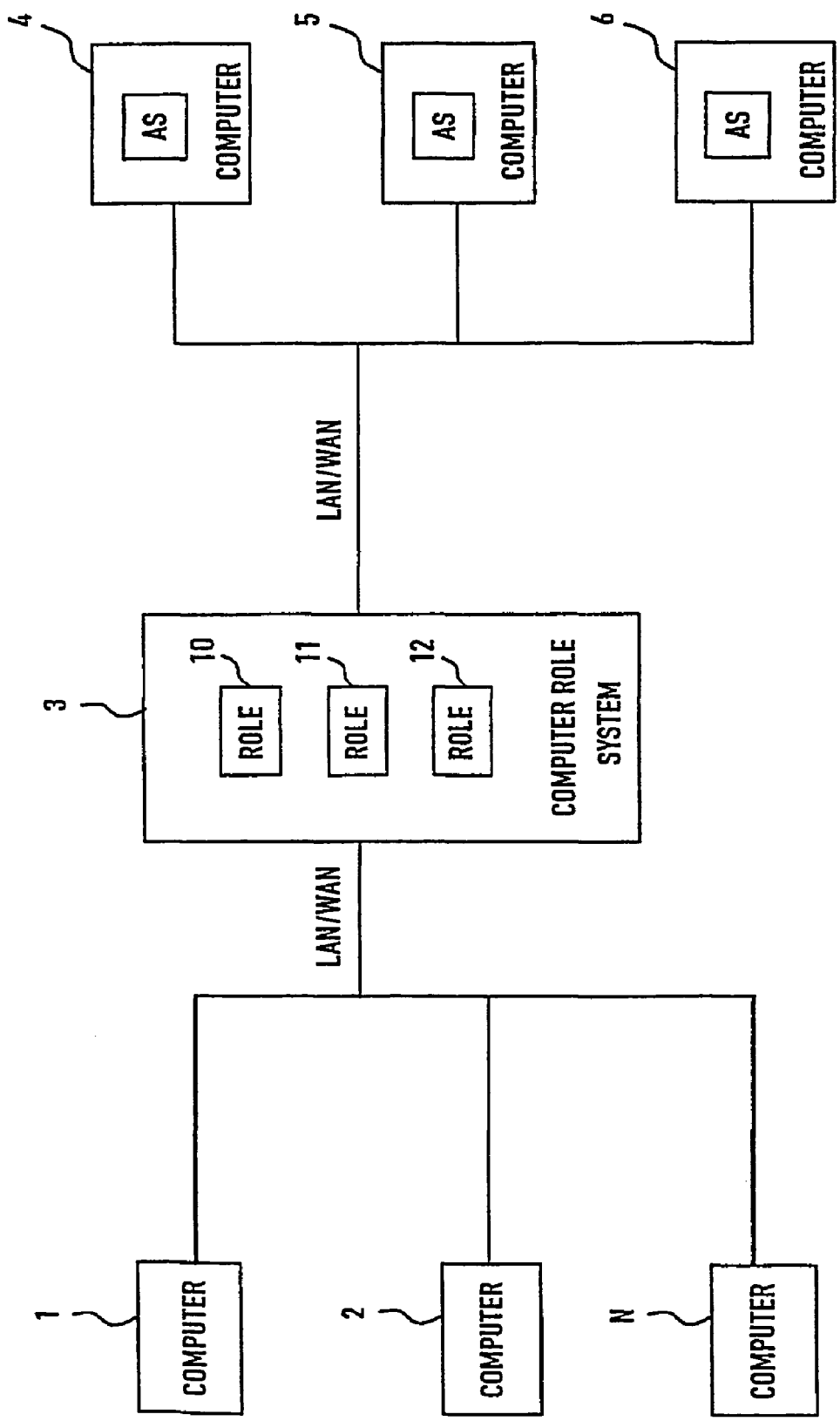
FIG. 1 illustrates a simplified diagram of a computer network with computer systems 1-6 that are interconnected.
Figure 2:
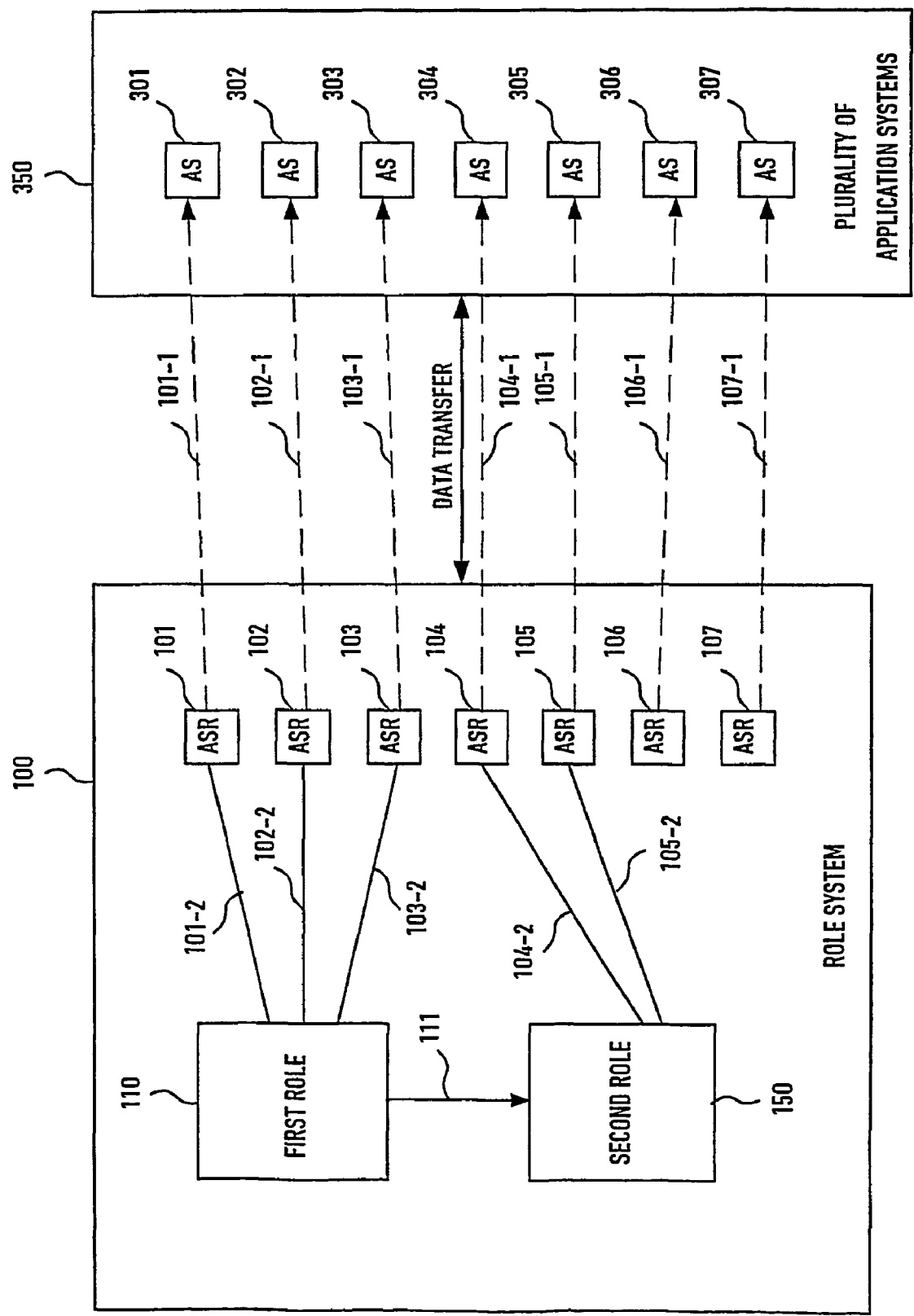
FIG. 2 illustrates a first operating state of a role system that is coupled to application services and operates according to the present invention.

FIG. 2 illustrates a first operating state of a role system 100 that operates according to the present invention and is coupled to application services 301-307 (labeled "AS"). Application services 301-307 are provided by a plurality of application systems 350. For convenience of explanation the single systems comprised by plurality 350 are not shown. Each system in plurality 350 is connected to role system 100 for the data transfer between role system 100 and plurality 350 of application systems. The present invention is embodied in role system 100; application services 301-307 as such are known in the art.

For convenience of explanation, role system 100 and application services 301-307 are considered as computer program products. System 100 comprises roles 110, 150 with application service representations 101-107 (labeled "ASR"). These application service representations 101-107 have logical connections (dashed arrows 101-1 to 107-1) to application services 301-307, respectively. Application service representations 101 to 103 are assigned to role 110 and application service representations 104 to 105 are assigned to role 150. The assignments are shown as solid lines 101-2 to 105-2 between the representations 101 to 105 and roles 110 and 150.

Roles 110 and 150 have a parent-child relationship 111, wherein the parent role 110 calls the child role 150 by reference 111. It is important that roles 110 and 150 not necessarily need to provide all application services that are needed by a user of an organization but can also simply be considered as building blocks for other roles.

System 100 and services 301-307 can be software implemented on one or more computers that comprise one or more processors, memory, buses, local or wide area networks, and other elements. Data formats and data protocols for data exchange between the different components in the network are known in the art and therefore not discussed further.

When the user wants to logon to role system 100, initially, role system 100 requests an identification from the user to determine what role is assigned to the user. Also further roles can be assigned to the user, when the user needs access to further application services that do not have representations in the user's first role . Once the roles are determined, system 100 launches for the user the application services 301-305 through application service representations 101-105 or 104-105 only, depending on the user's assignment to either first role 110 or second role 150, respectively.

The term "launch" means to trigger the execution of a requested application service. This can be done either with or without additional interaction by the user. In case of interaction, system 100 optionally offers the user graphical representations (like icons, text on the screen) of application services 301-307. The user selects one of the graphical representations and the corresponding application service is launched in the corresponding application system. The order of the graphical representations is not limiting the scope of the invention; however, optionally, the order can be predefined, for example, to show the graphical representations in the same order as the corresponding application services need to be executed within a business process.

Figure 3:
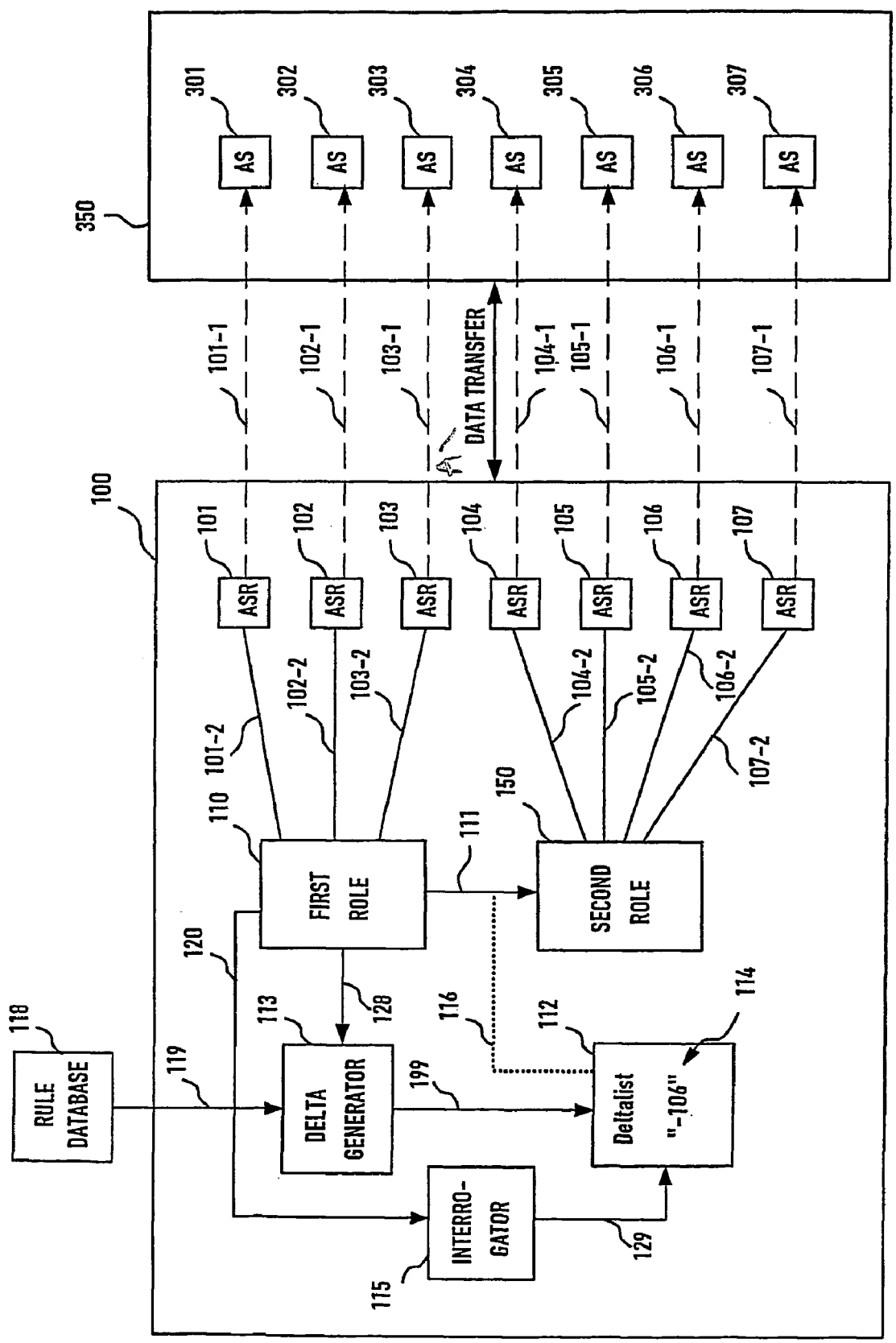
FIG. 3 illustrates a second operating state of the role system that is coupled to application services.

FIG. 3 illustrates a second operating state of role system 100 according to the present invention, where roles 110 and 150 (cf. FIG. 2) are modified during the operation of system 100 (cf. method 400 in FIG. 4) because, for example, a business process that was changed in the organization now requires the adjustment of roles according to the changes. For simplicity of explanation, it is assumed that additional representations of application services (106 and 107) are assigned (106-2, 107-2) to role 150. Persons of skill in the art can apply modification of roles as described in the present invention also when representations of application services are removed or replaced from a role.

Figure 4:
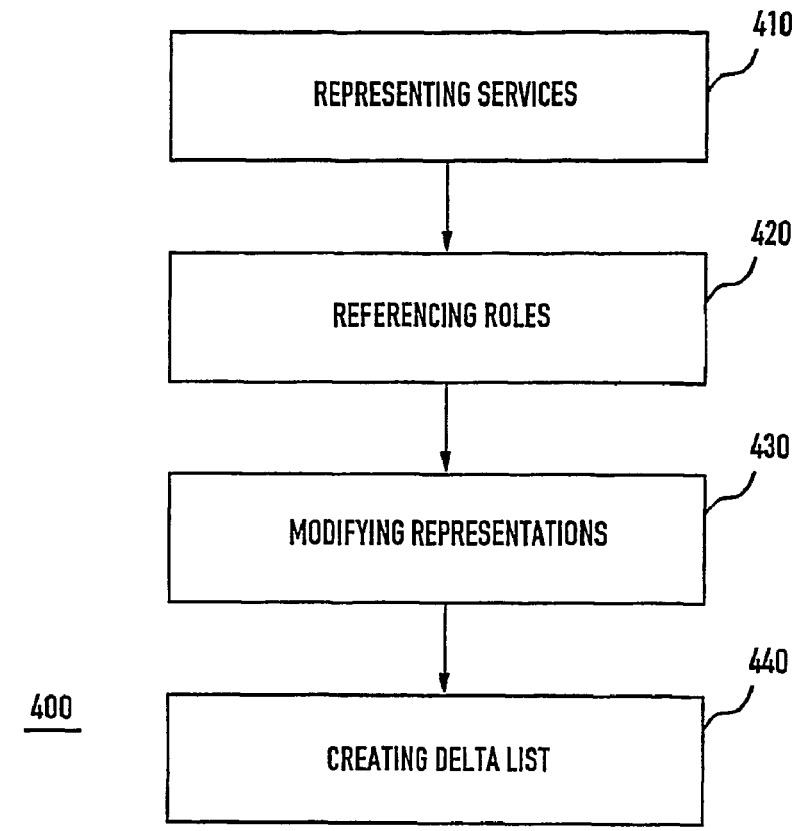
FIG. 4 illustrates a simplified flowchart diagram of a method to modify roles by creating a delta list.

Elements of role system 100 that facilitate role modifications according to method 400 described in FIG. 4 are illustrated in FIG. 3: a delta generator 113 receives modification data from first role 110 through connection 120.

The modification data are compared with rules stored in rule database 118 that is connected 119 to delta generator 113. It is not limiting for the invention that rule data base 118 is not part of role system 100 (as shown in FIG. 3). Delta generator 113 creates delta list 112 assigned to reference 111 through connection 199. Interrogator 115 also receives modification data form first role 110 through connection 120 and updates delta list 112 through connection 129. Details are explained under FIGS. 4-9.

FIG. 4 illustrates a simplified flowchart diagram of method 400 according to the present invention. Method 400 is performed, preferably, by role system 100 for modifying roles that launch application services (e.g., 301-307) for a first user (not shown) who is assigned to either role 110 or to role 150. Method 400 comprises the steps representing services 410, referencing roles 420, modifying representations 430, and creating delta list 440.

In step 410, system 100 represents application services 301-305 in role 110 with a first set (e.g., 101, 102, 103) of representations and role 150 with a second set (e.g., 104, 105) of representations. System 100 visualizes these sets of representations for each role 110, 150 on a display device (e.g. monitor) by using, for example, a specific icon for each representation. Preferably, system 100 provides (step 410) representations of the first set (101, 102, 103) and of the second set (104, 105) that are different. In other words, the intersection between the first and second set is zero. That means that each role 110, 150 only comprises the minimum of service representations that are required by the business processes to avoid redundancies in the content of roles.

In step 420, first role 110 calls second role 150 by reference 111.

In step 430, system 100 modifies (e.g. by installing a role upgrade) the second set of representations 104, 105 in role 150 (e.g., resulting in 104, 105, 106, 107 cf. FIG. 3). Via reference 111, these modifications become instantly valid for role 110, as well.

In step 440, delta generator 113 and interrogator 115 create delta list 112 with delta entries 114 for reference 111. Preferably, delta list 112 prevents role 110 from referencing to at least some of the modifications in the second set of representations 104, 105, 106, 107 in role 150. The assignment of delta list 112 to reference 111 is symbolized as dotted line 116 in between. In the example shown in FIG. 3 predefined rules in rule data base 118 (further details below) cause the delta generator 113 to conclude that application service representation 106, although now assigned to role 150, must not be part of role 110. Therefore, delta generator 113 creates delta list 112 and writes delta entry 114 "–106" into delta list 112. The minus sign of delta entry "–106" (cf. FIG. 3) illustrates exclusion of representation 106 from role 110.

To look more into details of method 400, in step 430, system 100 modifies the second set of representations (104, 105) (cf. FIG. 2) in role 150 by adding or removing representations of application services. For added representations 106, 107 (cf. FIG. 3), delta generator 113 creates delta list 112 as an exclusion list-(negative delta entries 114). System 100 prevents role 110 from launching application services 306 where the corresponding representations 106 are excluded by delta list 112 through delta entry 114 "–106". Accordingly, for representations removed from the second set, delta generator 113 creates delta list 112 as an inclusion list indicating these representations that have been removed from role 150 but that are still to be launched by role 110. Delta generator 113 creates list 112 without human interaction, for example, by applying rules stored in look-up rule database 118 connected 119 (cf. FIG. 3) to delta generator 113; or, interrogator 115 modifies delta list 112 with user interaction, for example, by asking for confirmation of the modifications of role 110 (details in FIG. 5).

Turning back to FIGS. 2-3, method 400 is now explained by a first example. FIG. 2 illustrates the state of system 100 after completion of representing services 410 and referencing roles 420; and FIG. 3 illustrates the state after completion of modifying representations 430 and creating delta list 440. As in FIG. 2, system 100 is delivered to users with predefined roles 110 and/or 150 for launching application services 301-305. Roles 110 and 150 are related, i.e. role 110 being the "parent" role and role 150 being the "child" role. Role 110 comprises representations 101, 102 and 103 (first set) to applications services 301, 302 and 302, respectively. Reference 111 is a pointer to the complete role 150, that is to all representations in role 150. Role 150 comprises representations 104 and 105 (second set) to applications services 304 and 305, respectively. Due to the inter-role referencing 111, for a role 110 user, system 100 launches not only services 301-303 but also launches services 304-305. For a role 150 user, system 100 launches services 304-305 only.

As in FIG. 3, new representations of application services 106 and 107 referring to application services 306 and 307 are added to role 150 in accordance with step 430 to modify the second set of representations 104, 105. According to the present invention, both roles 110, 150 are updated instantaneously. Role 150 then comprises the modified second set 104, 105, 106, 107.

To comply with the above mentioned predefined rules stored in rule database 118, delta generator 113 creates delta list 112, here in the example with delta entry 114 "–106". In case service 306 conflicts with service 301 if performed by the same role, delta generator 113 detects this conflict comparing the combination of the corresponding representations 101 and 106 with the rules in rule data base 118 and writes delta entry 114 "–106" into delta list 112. The minus sign in "–106" illustrates exclusion of representation 106. It is not required by the invention that a rule data base 118 is part of system 100. Now, role 110 is prevented from referencing to representation 106 in the modified second set in role 150. Therefore, service 306 is excluded from being launched by role 110. A person using system 100 in role 110 now is able to use services 301-305 and in addition service 307.

The use of delta list 112 according to the present invention eases the management of the role system 100. For example, in the prior art role system, each role modification requires the creation of new versions for all dependent roles, these are all roles that reference to the modified role directly or indirectly through other roles. The prior art role system leads to a complex role network that simultaneously uses different versions of the same role. By using delta lists as described in the present invention, only one actual version of each role 110, 150 is needed, wherein all modifications are reflected in the actual version of the modified roles 110, 150 and the delta list 112. As a result, system 100 calculates the representations of application services ASR that can launch corresponding application services AS from role 110 as the sum of:

a) all representations assigned to the parent role 110,
b) all representations assigned to the child role 150 and
c) all delta entries 114 in delta list 112 assigned to reference 111 between the roles.

Figure 5:
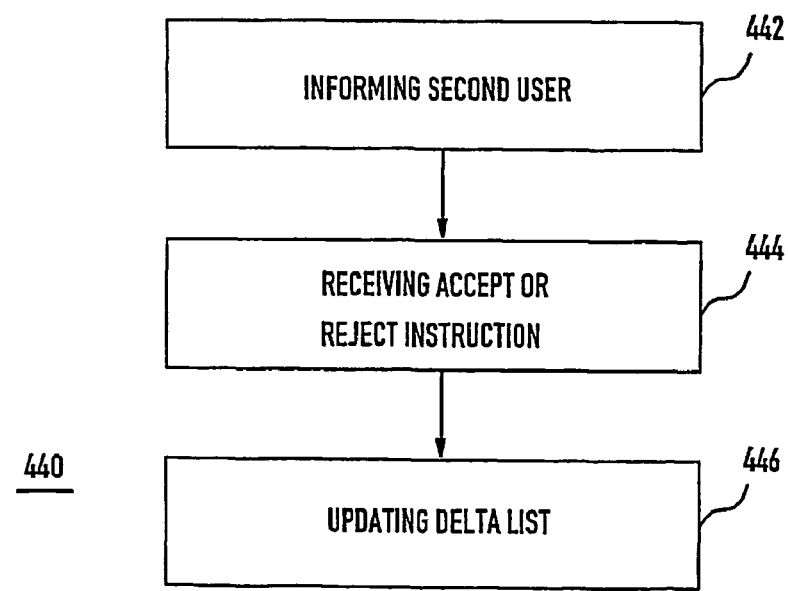
FIG. 5 illustrates a preferred embodiment for step 440 in the method shown in FIG. 4.

FIG. 5 illustrates a preferred embodiment for method step 440 creating delta list in method 400 of FIG. 4. System 100 creates delta list 112 by: informing a second user 442 about the modification to the second role 150 through interrogator 115, e.g. via display (cf. FIG. 6); and receiving 444 from the second user the instruction to accept or to reject some or all of the modifications (e.g., by reading a key stroke); and—in case of instructions from the second user—updating 446 delta list accordingly.

Preferably, the "second user" is a person different from a person assigned to role 110 or 150. Usually, the "second user" is an administrator of role system 100.

Figure 6:
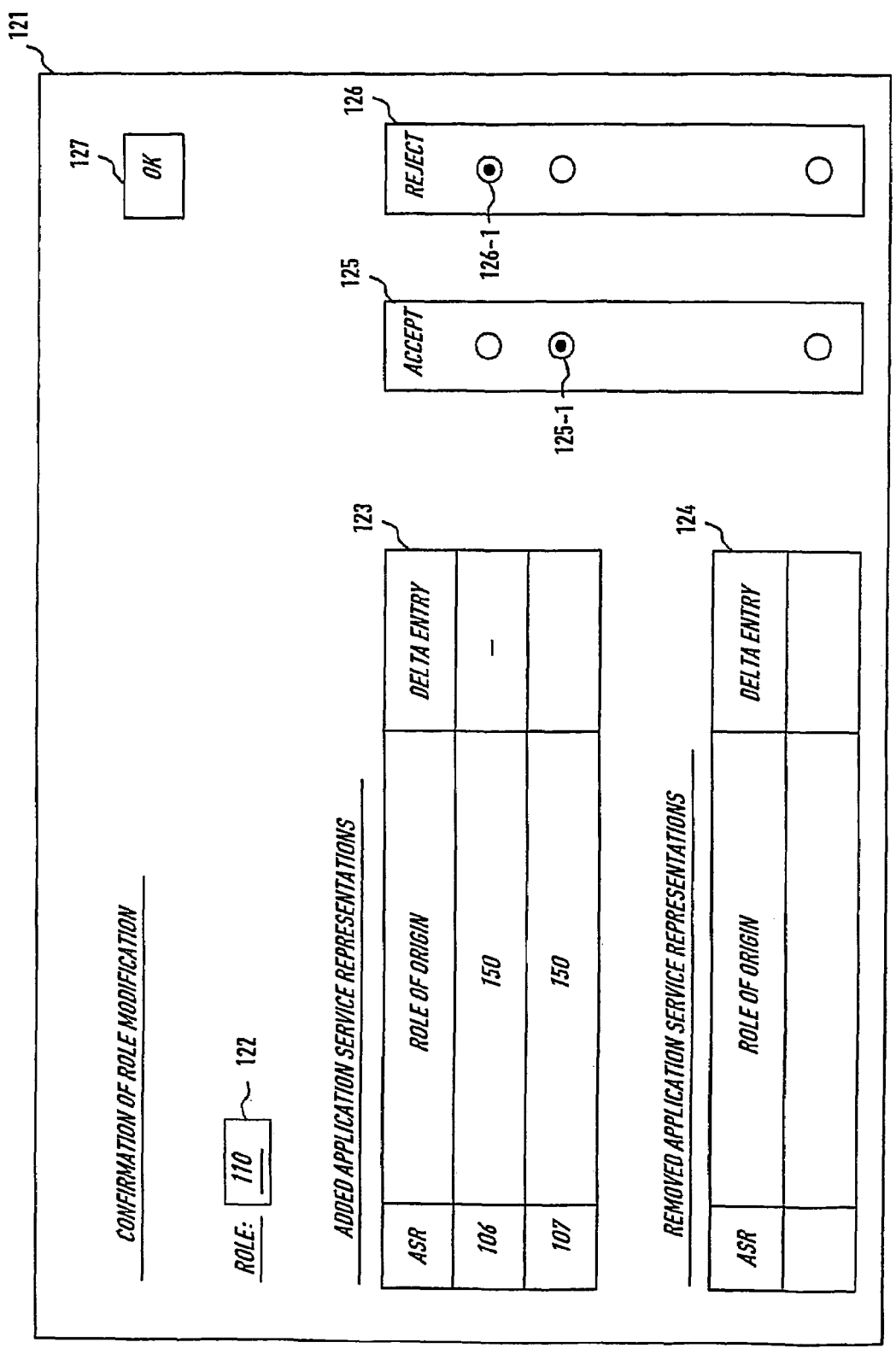
FIG. 6 illustrates a preferred embodiment of the interrogator shown in FIG. 3.

FIG. 6 illustrates a preferred embodiment of interrogator 115. Letters in italics symbolize text that is displayed in a confirmation form 121 to a user on a display. Confirmation form 121 is generated by interrogator 115 based on modification information provided by role 110. Form 121 comprises role identification 122 (role ID) of the modified role as well as tables 123 and 124 showing all relevant modifications of representations ("ASR" column) that occurred in child roles ("role of origin" column) and already existing delta entries ("delta entry" column) for the modified representation. Thereby, table 123 refers to added application service representations and table 124 refers to removed application service representations. The second user accepts or rejects the modifications for role ID 122 by either selecting an "accept" radio button 125-1 out of a first plurality 125 of radio buttons or a "reject" radio button 126-1 out of a second plurality 126 of radio buttons for each modified representation. By pushing the OK-button 127 the second user starts the interrogator 115 to update delta list 112 accordingly.

Figure 7:
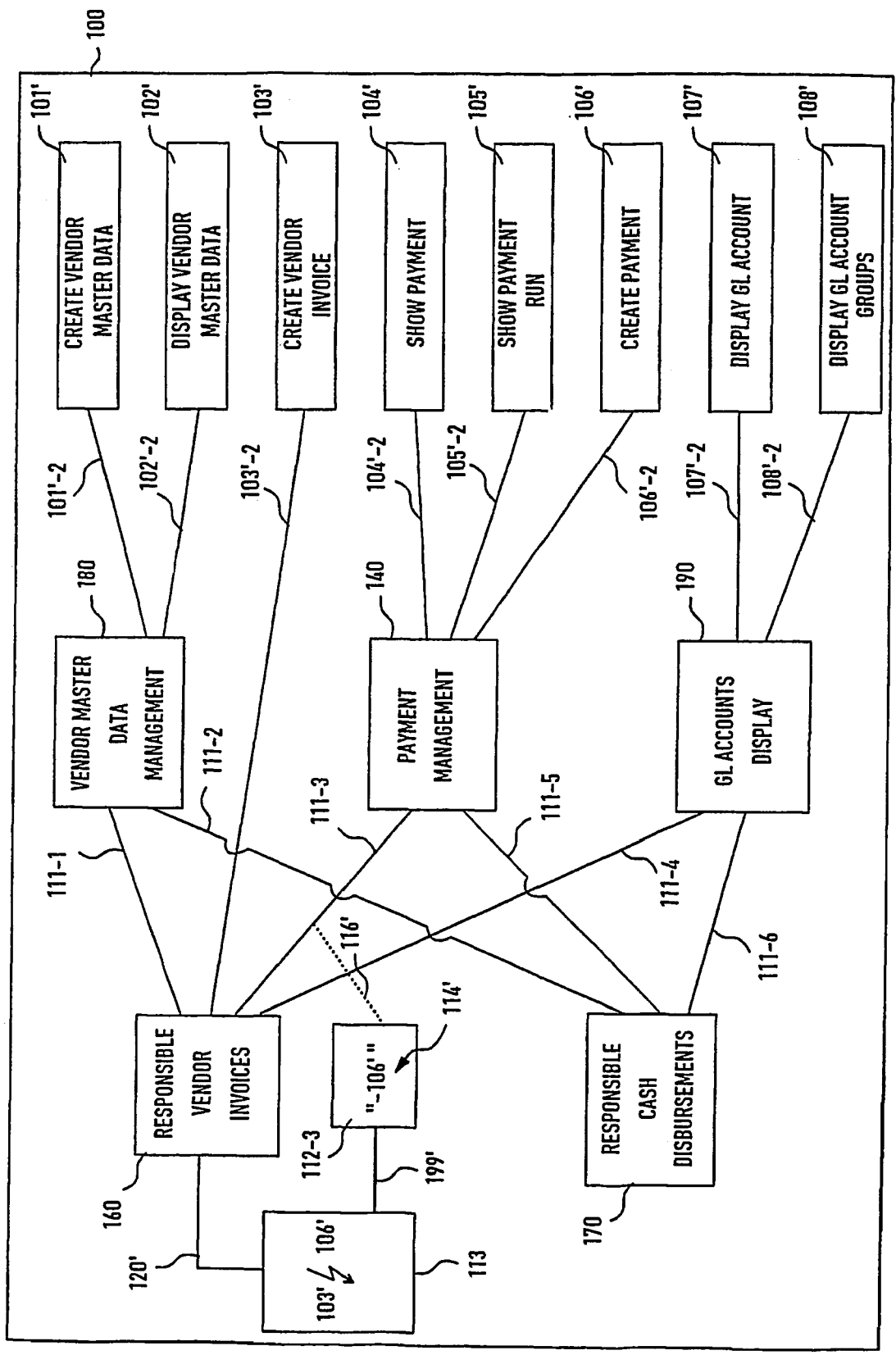
FIG. 7 illustrates a role hierarchy diagram.

FIG. 7 illustrates, in a second example, a further role hierarchy diagram for multiple roles in system 100, wherein roles 160 ("RESPONSIBLE FOR VENDOR INVOICES") and 170 ("RESPONSIBLE FOR CASH DISBURSEMENTS") represent parent roles that call the child roles 140 ("PAYMENT MANAGEMENT"), 180 ("VENDOR MASTER DATA MANAGEMENT") and 190 ("GL ACCOUNTS DISPLAY") by references 111-1 to 111-6. Each child role has two parents (roles 160 and 170) because roles 160 and 170 have a high overlap in jointly used representations of application services:

101' ("CREATE VENDOR MASTER DATA") assigned 101'-2 to role 180,
102' ("DISPLAY VENDOR MASTER DATA") assigned 102'-2 to role 180,
104' ("SHOW PAYMENT") assigned 104'-2 to role 140,
105' ("SHOW PAYMENT RUN") assigned 105'-2 to role 140,
106' ("CREATE PAYMENT") assigned 106'-2 to role 140,
107' ("DISPLAY GL ACCOUNT") assigned 107'-2 to role 190, and
108'-2 ("DISPLAY GL ACCOUNT GROUPS") assigned 108' to role 190.

The representation 103' ("CREATE VENDOR INVOICE") is assigned 103'-2 to role 160 only. The rule data base 118 (cf. FIG. 3) contains a rule that indicates that representation 103' ("CREATE VENDOR INVOICE") and 106' ("CREATE PAYMENT") must not be performed by the same role as this combination holds a considerable risk (loss of cash) for the company. A user who is assigned to a role that provides service representations 103' and 106' simultaneously could release payments without further control for any invoice (of any amount) that he or she created. Role 160 calls role 140 by reference 111-3 and role 140 has representation 106' assigned to it. Therefore, the described risk arises for role 160 with the shown relationships. Delta generator receives data from role 160 through connection 120'. Delta generator 113 detects all possible conflicts by comparing all combinations of representations in role 160 with the rules in the rule data base 118 (cf. FIG. 3). Then, delta generator 113 resolves the conflict by creating (through connection 199') a delta list 112-3 that is assigned to reference 111-3 (dotted line 116') and writing delta entry 114' (−106') to delta list 112-3. Thus, role 160 can launch an application service that is represented by representation 103' but not by representation 106'. As users can be assigned to any role at any hierarchy level the usage of delta lists minimizes the business control risks that a company would encounter through poor role design.

Figure 8:
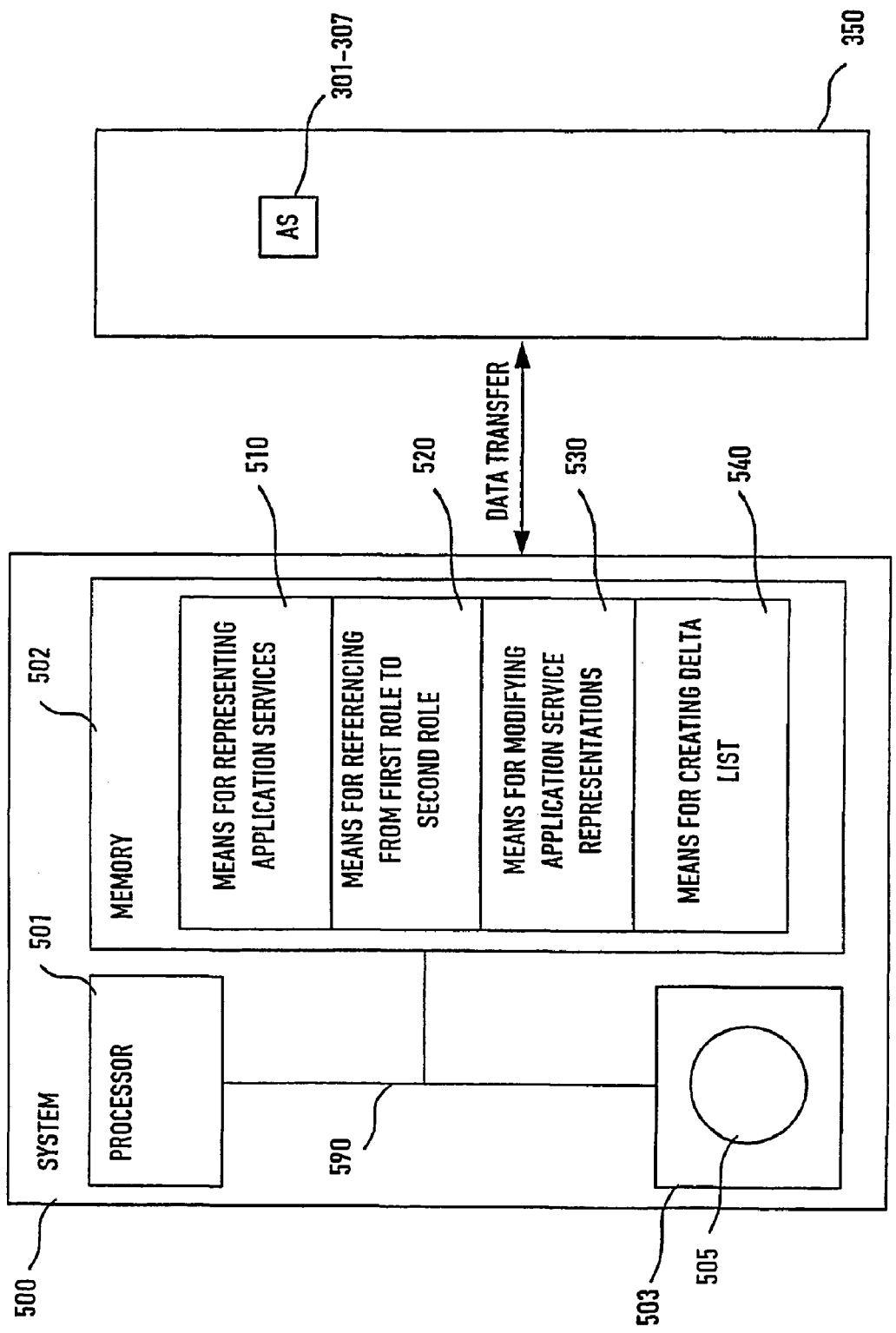
FIG. 8 illustrates a simplified block diagram of a computer system for launching application services through roles and modifying the roles.

FIG. 8 illustrates a simplified block diagram of a computer system 500 according to the present invention. System 500 launches application services (301-307, cf. FIGS. 2-3) by a first user who is assigned to either a first role or to a second role. Computer system 500 preferably comprises a digital processing unit 501 (processor) and a memory 502. The system is characterized by:

a first means 510 for representing the application services in the first role with a first set of representations and in the second role with a second set of representations (cf. FIGS. 2-3; e.g. roles 110, 150; e.g. ASR 101-105);
a second means 520 for referencing from the first role to the second role by a first reference;
a third means 530 for modifying the second set of representation in the second role; and
a forth means 540 for creating a delta list (e.g. delta list 112; cf. FIG. 3) assigned to the first reference (e.g. reference 111; cf. FIG. 3). Preferably the delta list prevents the first role from referencing to at least some of the modifications in the second set of representations.

Preferably, means 510 to 540 are implemented as executable program code in memory 502 and can be executed by processor 501. The executable program code can be loaded into memory 502 from a computer readable medium 505 via input device 503. All components of system 500 are connected via a bus 590. A person skilled in the art can implement means 510-540 by using the functions of processor 501 and memory 502 of system 500.

A preferred embodiment of data structures and how these data structures are used by system 500 is explained in the following. All data structures reside in memory 502 and are processed by processor 501. A first data structure is a data table that comprises the assignment of roles to users (table 1). For example role 160 is assigned to user U1, role 170 is assigned to user U2 and roles 140 and 190 are assigned to user U3. When a user logs on to the role system 500 the corresponding assignment that is stored in table 1 in memory 502 is executed by processor 501.

TABLE 1

User-to-role assignment table

| User | Role |
|---|---|
| U1 | 160 |
| U2 | 170 |
| U3 | 140 |
| U3 | 190 |
| . | . |
| . | . |
| . | . |

A second data structure is the Inner-Role-Assignment table (table 2), where the assignments of application service representations to roles and the assignments of roles to other roles (through references) are stored in memory 502. The content of table 2 corresponds to the role hierarchy example in FIG. 7. For example parent role 160 has reference 111-1 to child role 180 (second row of table 2). Application service representation (ASR) 103' is assigned to parent role 160 through assignment 103'-2 (third row of table 2). Means 520 uses processor 501 to build the complete role hierarchy by reading table 2 from memory 502 and executing all reference calls. Processor 501 also executes all assignments of table 2.

TABLE 2

Inner-Role-Assignment table

| Parent Role | Child Role | Reference | ASR | Assignment |
|---|---|---|---|---|
| 160 | 180 | 111-1 | | |
| 160 | | | 103' | 103'-2 |
| 160 | 140 | 111-3 | | |
| 160 | 190 | 111-4 | | |
| 170 | 180 | 111-2 | | |
| 170 | 140 | 111-5 | | |
| 170 | 190 | 111-6 | | |
| 180 | | | 101' | 101'-2 |
| 180 | | | 102' | 102'-2 |
| 140 | | | 104' | 104'-2 |
| 140 | | | 105' | 105'-2 |
| 140 | | | 106' | 106'-2 |
| 190 | | | 107' | 107'-2 |
| 190 | | | 108' | 108'-2 |
| . | . | . | . | . |
| . | . | . | . | . |
| . | . | . | . | . |

Figure 9:
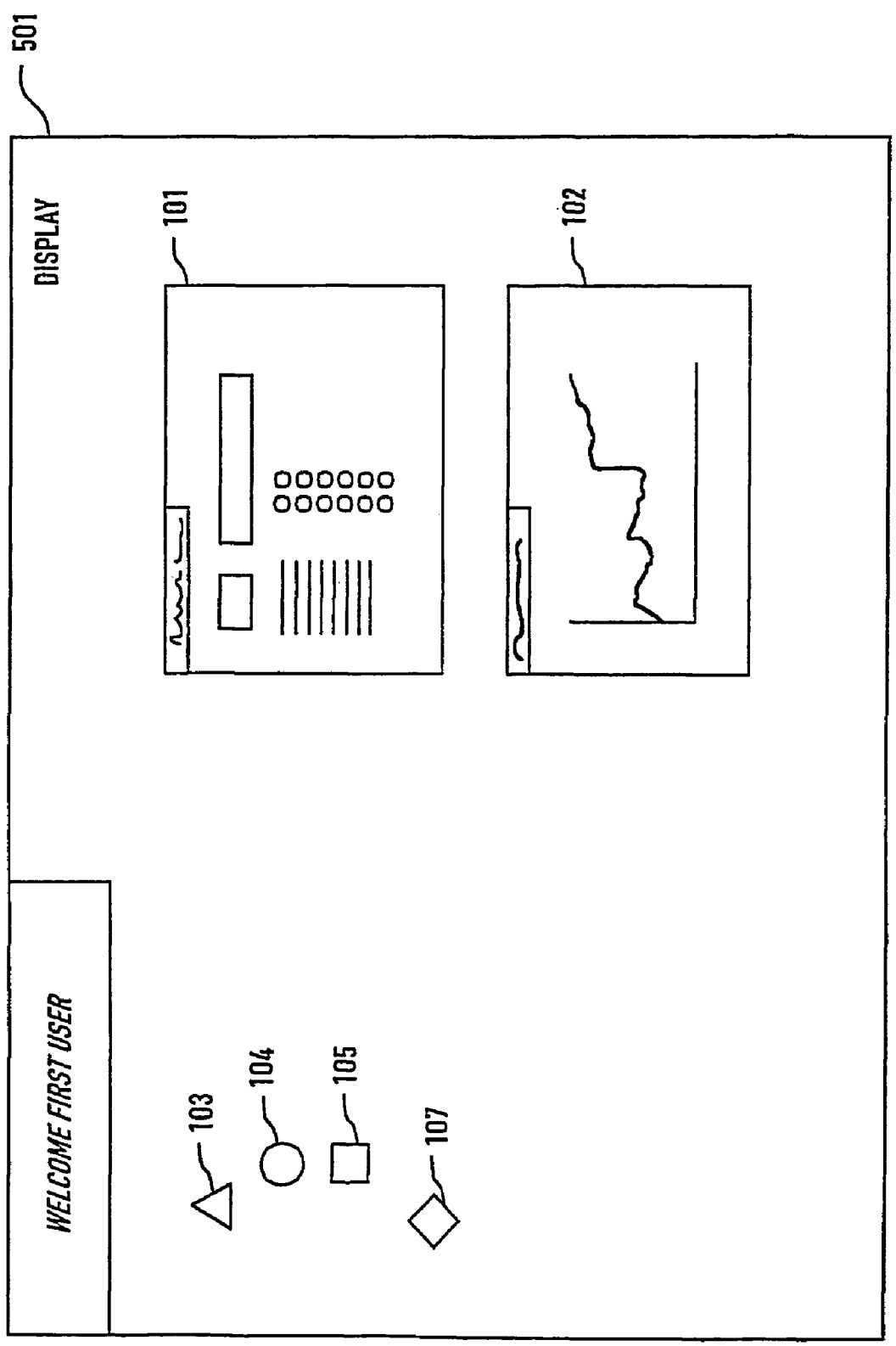
FIG. 9 illustrates a preferred embodiment of presenting representations of application services to the user.

Means 510 provides a visualization of application service representations on a display similar to the one shown in FIG. 9 to the users U1, U2, . . . according to the roles assigned to the users in table 1 and the inner-role-assignments in table 2.

Means 530, for example, can implement a role upgrade that modifies application service representations in roles by reading corresponding role data with an input device from a computer readable medium and storing these data in table 2.

The delta generator 113 is implemented in means 540 (cf. FIG. 7). Means 540 compares the content of table 2 for each role (e.g. role 160 in FIG. 7) with the content of a third data structure.

The third data structure is a rule data base 118 (cf. FIG. 3) that needs not to be part of system 500. The rule data base is loaded into memory 502 through, for example, a bus or another network connection and is stored in table 3. The rule data base in table 3 comprises a first column with a first application service representation (ASR 1), such as 103', and a second column with a second application service representation (ASR 2), such as 106', wherein the two service representations are conflicting when accessible through the same role (e.g. role 160). Means 540 first identifies all combinations of application service representations that are assigned to a parent role either directly or indirectly through referenced roles (cf. table 2) and that are in conflict according to the content of table 3.

TABLE 3

Rule Data Base

| ASR 1 | ASR 2 |
|---|---|
| 103' | 106' |
| . | . |
| . | . |
| . | . |

Means 540 then creates a delta list (e.g. delta list 113 in FIG. 7) in case a conflict is identified as described in the previous paragraph. The delta list is a fourth data structure that is stored in table 4 and resides in memory 502. Using processor 501 means 540 writes the corresponding delta entries (e.g. delta entry 114' (−106')) into table 4. Each entry in table 4 comprises a) the parent role, where the conflict was identified (e.g. role 160),
b) the reference (e.g. 111-3) to a child role that caused the conflict by being modified and
c) the delta entry (e.g. delta entry 114'; cf. FIG. 7) that describes, which application service representation of the child role (e.g. 106') has to excluded or included for the parent role.

TABLE 4

Delta list

| Role | Reference | Delta entry |
|---|---|---|
| 160 | 111-3 | −106' |
| . | . | . |
| . | . | . |
| . | . | . |

Having described details of the invention by method and system is convenient for explanation. To summarize the present invention, it is now described as a computer program product. Computer program product comprises a sequence of instructions for a general purpose processor (e.g. the processor 501 of system 500) that, when executed, causes the following:

(a) a plurality of roles (110, 150) is hierarchically related to each other with parent roles (110) and child roles (150), wherein parent roles (110) call by reference to child roles (150) and child roles can have multiple parents; and (b) modifications to child roles (150) are evaluated for the related parent role (110) such that the reference (111) from the parent role (110) to the child role (150) receives a delta list (112) for some of the application services represented by the related child role (150).

The computer program product presents all services that result from the particular parent role (110), the referenced child role (150) and the delta list (112) on a display to the user who is assigned to a particular parent role (110).

The present invention can also be defined as computer-readable medium 505 ("article of manufacture") having a plurality of sequences of instructions stored thereon which, when executed by a processor (e.g. processor 501 of system 500, or more processors), cause it to perform the steps of method 400. In the example, of FIG. 8, medium 505 is illustrated as a CD-ROM that is inserted into and readable by an input device (not shown) of system 500.

FIG. 9 illustrates preferred method step 450 of presenting on display 501 to the first user the first set 101-103 and second set 104-10) of representations of application services under consideration of the delta list "−106". Different graphical representations of representations 101-105 and 107 indicate different types of the corresponding application services 301-305 and 307. Different types of an application service can be, for example, a business transaction service, a web service, a document service or any other service type that can be accessed through a role. For example,

101 is displayed as a data entry mask being always ready for data entry through the first user;

102 is displayed as a graphical report showing the current development of a KPI (Key Performance Indicator) of the first user;

103 is displayed as a triangle icon, which stands for an information service, such as company news;

104 is displayed as a circle icon, which stands for a business transaction, such as 'create vendor invoice';

105 is displayed as a square icon, which stands for a web service, such as an internet search engine;

107 is displayed as a rhombus icon, which stands for a document service, such as a document describing a specific business process.

Graphical representation of service representations can be performed otherwise, for example, by one or more selected from the following:

showing a text on a computer display;
showing an icon on a computer display;
showing a video sequence on a computer display, wherein the sequence symbols the action expected by the application service;
showing a table;
showing a hyperlink;
presenting prerecorded audio data via a speaker;
presenting a voice message via a speaker, wherein the message is generated from a voice generator;
dialing phone connection;
checking a user authentication with password and issuing an alarm message.

The invention claimed is:

1. Method (400) for modifying roles that launch application services (301-307) for a first user who is assigned to at least one role,
the method (400) comprising the following steps:
representing (410) the application services (301, 302, 303) that are assigned to a first role (110) with a first set of representations (101, 102, 103) and the application services (304, 305) that are assigned to a second role (150) with a second set of representations (104, 105);
referencing (420) from the first role (110) to the second role (150) by a first reference (111);
modifying (430) the second set of representations (104, 105) in the second role (150); and
creating (440) a delta list (112) for the first reference (111).

2. The method of claim 1, wherein the creating step (440) the delta list (112) prevents the first role (110) from referencing to at least one modification in the modified second set (104, 105, 106, 107) of representations of the second role (150).

3. The method of claim 2, wherein the modifying step (430) the second set of representations (104, 105) in the second role (150) is modified by adding at least one representation (106, 107) to the second set of representations (104, 105).

4. The method of claim 3, wherein the creating delta list step (440) the delta list (112) indicates representations in the modified second role (150) that are excluded from being launched by the first role (110).

5. The method of claim 2, wherein comprising the further step of presenting (450) to the first user the first set (101, 102,103) and second set (104,105,106,107) of representations of application services (301-307), depending on delta entries (114) in the delta list (112).

6. The method of claim 5, wherein the step presenting (450) includes at least one selected from the group consisting of:
showing a text on a computer display;
showing an icon on a computer display;
showing a video sequence on a computer display, wherein the sequence symbols the action expected by the application service;
showing a table;
showing a hyperlink;
presenting prerecorded audio data via a speaker;
presenting a voice message via a speaker, wherein the message is generated from a voice generator;
dialing phone connection;
checking a user authentication with password;
issuing an alarm message.

7. The method of claim 2, wherein the modifying step (430) the second set of representations (104, 105) in the second role (150) is modified by removing at least one representation from the second set of representations.

8. The method of claim 7, wherein the creating delta list step (440) the delta list (112) indicates representations that have been removed from the second set in the modified second role (150) but that are still to be launched by the first role (110).

9. The method of claim 1, wherein the step (440) of creating the delta list (112) is performed as follows:
informing (442) a second user about the modification to the second role (150); and
receiving (444) from the second user the instruction to accept or to reject some or all of the modifications.

10. The method of claim 9 with the further step of updating (446) the delta list (112).

11. The method of claim 1, wherein said creating delta list step (440) comprises looking up in a rule database (118), the rule database with representations of application services that are mutually exclusive when used by a single user.

12. The method of claim 1, wherein said creating delta list step (440) comprises checking for conflicts between the subset of the first role (110) and the modified subset of the second role (150).

13. The method of claim 1, wherein the providing step (410) provides the first set (101,102,103) and the second, different set (104, 105) of representations.

14. A computer program product that provides representations of application services (101,102, . . . ) to a user depending on the role that is assigned to the user, wherein said computer program product launches corresponding application services (301-307) through said representations characterized in that
(a) a plurality of roles (110, 150) is hierarchically related to each other with parent roles (110) and child roles (150), wherein parent roles (110) call by reference to child roles (150); and
(b) modifications to child roles (150) are evaluated for the related parent role (110) such that the reference (111) from the parent role (110) to the child role (150) receives a delta list (112) for some of the application services (301, 302, . . . ) represented by the related child role (150).

15. The computer program product of claim 14, wherein for a user who is assigned to a particular parent role (110), the computer program product presents all services that result from the particular parent role (110), the referenced child role (150) and the delta list (112).

16. The computer program product of claim 14, wherein child roles (150) can have multiple parents.

17. Computer system (500) for launching application services (301, 302, . . . ) by a user who is assigned to at least one role, comprising:
a first means (510) for representing the application services (301, 302, . . . ) in a first role (110) with a first set of representations (101,102,103) and in a second role (150) with a second set of representations (104,105);
a second means (520) for referencing from the first role (110) to the second role (150) by a reference (111);
a third means (530) for modifying the second set of representation (104,105) in the second role (150); and a forth means (540) for creating a delta list (112) for the reference (111).

18. The computer system of claim 17 wherein the delta list (112) prevents the first role (110) from referencing to at least one modification in the second set of representations of the second role (150).

19. A computer-readable medium (505) having a plurality of sequences of instructions stored thereon which, when executed by one or more processors, cause said one or more processors to perform the steps of:

representing (410) application services (301, 302, . . . ) in a first role (110) with a first set (101,102,103) of representations and in a second role (150) with a second set (104,105) of representations;

referencing (420) from the first role (110) to the second role (150) by a first reference (111);

modifying (430) the second set of representation in the second role; and creating (440) a delta list (112) for the first reference (111).

20. The computer-readable medium of claim 19, wherein during execution, in the creating step (440), the delta list prevents the first role (110) from referencing to at least one modification in the second set of representations of the second role (150).

21. The computer-readable medium of claim 19, wherein during execution, in the modifying step (430), the second set of representations in the second role is modified by adding at least one representation (106,107).

22. The computer-readable medium of claim 21, wherein during execution, wherein the creating delta list step (440) the delta list (112) indicates representations in the modified second role (150) that are excluded from being launched by the first role (110).

* * * * *